United States Patent
Schwarz et al.

(10) Patent No.: US 11,306,843 B2
(45) Date of Patent: Apr. 19, 2022

(54) COMMISSIONING A DIAPHRAGM VALVE

(71) Applicant: Georg Fischer Rohrleitungssysteme AG, Schaffhausen (CH)

(72) Inventors: Manuel Schwarz, Constance (DE); Novica Lalevic, Buelach (CH)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 170 days.

(21) Appl. No.: 16/869,072

(22) Filed: May 7, 2020

(65) Prior Publication Data

US 2020/0378518 A1     Dec. 3, 2020

(30) Foreign Application Priority Data

May 29, 2019  (EP) .................................. 19177295

(51) Int. Cl.
*F16K 31/02* (2006.01)
*F16K 31/04* (2006.01)
(Continued)

(52) U.S. Cl.
CPC .............. *F16K 31/046* (2013.01); *F16K 7/16* (2013.01); *F16K 7/12* (2013.01); *F16K 31/02* (2013.01);
(Continued)

(58) Field of Classification Search
CPC .......... F16K 31/046; F16K 31/02; F16K 7/16; F16K 7/12; F16K 37/0041; F16K 37/0075; G01B 7/003
(Continued)

(56) References Cited

U.S. PATENT DOCUMENTS 3,635,438 A * 1/1972 Peters ................. F16K 31/0655
                                                251/129.1
3,811,465 A * 5/1974 Abbey ................. F16K 31/0655
                                                137/487.5
(Continued)

FOREIGN PATENT DOCUMENTS

DE      102015210208 A1     12/2016
DE      102017128542 A1      6/2018
(Continued)

*Primary Examiner* — Minh Q Le
(74) *Attorney, Agent, or Firm* — Harness, Dickey & Pierce, P.L.C.

(57) ABSTRACT

A method for determining the end-of-travel positions of a diaphragm in a diaphragm valve having an actuator:
  initiating displacement of the diaphragm into a first end-of-travel position;
  ascertaining the first end-of-travel position of the diaphragm, wherein said first end-of-travel position is ascertained by monitoring an actuating current value, wherein the first end-of-travel position is reached when a predefined current value is reached;
  saving the first end-of-travel position;
  moving autonomously, preferably in the opposite direction, towards a second end-of-travel position of the diaphragm;
  ascertaining the second end-of-travel position of the diaphragm, wherein said second end-of-travel position is ascertained by means of a predefined travel length (a) of the diaphragm from the first end-of-travel position;
  saving the second end-of-travel position.

8 Claims, 1 Drawing Sheet

(51) Int. Cl.
*F16K 7/16* (2006.01)
*G01B 7/00* (2006.01)
*F16K 7/12* (2006.01)
*F16K 37/00* (2006.01)

(52) U.S. Cl.
CPC ...... *F16K 37/0041* (2013.01); *F16K 37/0075* (2013.01); *G01B 7/003* (2013.01)

(58) Field of Classification Search
USPC ............... 251/129.12, 129.17, 331, 335.2; 137/315.05, 799, 487.5
See application file for complete search history.

(56) References Cited

U.S. PATENT DOCUMENTS

| | | | | |
|---|---|---|---|---|
| 4,581,624 | A * | 4/1986 | O'Connor | F15C 5/00 137/831 |
| 5,127,625 | A * | 7/1992 | Kleinhappl | F16K 31/0655 251/129.17 |
| 5,417,142 | A * | 5/1995 | Lohmann | F16K 31/02 137/625.65 |
| 5,711,507 | A * | 1/1998 | Berget | F16K 31/04 251/129.04 |
| 6,948,697 | B2 * | 9/2005 | Herbert | F16K 31/0672 251/129.04 |
| 10,378,672 | B2 * | 8/2019 | Beck | F16K 31/1221 |
| 2002/0148991 | A1 * | 10/2002 | Herbert | F16K 7/14 251/30.02 |
| 2007/0241298 | A1 * | 10/2007 | Herbert | F16K 7/16 251/129.04 |
| 2014/0131607 | A1 * | 5/2014 | Ehmig | F16K 7/126 251/285 |
| 2015/0041691 | A1 * | 2/2015 | Buhler | F16K 7/126 251/129.01 |
| 2015/0369378 | A1 * | 12/2015 | Umeyama | F16K 7/123 137/486 |
| 2018/0163896 | A1 * | 6/2018 | Mueller | F16K 37/0091 |
| 2019/0219191 | A1 | 7/2019 | Hunnekuhl et al. | |

FOREIGN PATENT DOCUMENTS

| | | |
|---|---|---|
| EP | 2118539 B1 | 9/2011 |
| JP | H0539885 A | 2/1993 |
| JP | 2017194142 A | 10/2017 |

* cited by examiner

COMMISSIONING A DIAPHRAGM VALVE

CROSS-REFERENCE TO RELATED APPLICATION

The present application is based on, and claims priority from European Patent Application No. 19 177 295.3, filed May 29, 2019, the disclosure of which is hereby incorporated by reference herein in its entirety.

FIELD OF THE INVENTION

The invention relates to a method for determining the end-of-travel positions of a diaphragm in a diaphragm valve comprising actuator, and to a diaphragm valve comprising positioning actuator, which valve adjusts itself autonomously during commissioning.

BACKGROUND OF THE INVENTION

Diaphragm valves that have positioning actuators and in which the diaphragm performs a predefined stroke are known from the prior art. This means also that the diaphragm valve has a specified open position in which the diaphragm in a top end-of-travel position travels to a mechanical end stop, and for a closed diaphragm valve, the positioning actuator likewise travels to a mechanical end stop or travels downwards as far as possible. As a result of manual assembly, production tolerances and setting of the mechanical end stops, the positions may vary, and the ends of travel of the diaphragm cannot be aligned exactly with the mechanical end stops, thereby placing higher stress on the diaphragm because higher forces are acting thereon and hence causing faster wear.

EP 2 118 539 B1 discloses a diaphragm for a process-controlled apparatus, said diaphragm comprising a pressure-responsive region, whereby the applied pressure can be adapted appropriately. The disadvantage here is that the pressure-responsive region makes the diaphragm expensive to produce, and moreover, there is a need for additional sensors, which also must be connected.

SUMMARY OF THE INVENTION

The aspect of the invention is to propose a method and an associated diaphragm valve in which the valve is conserved and the lifetime increased while also allowing correction for tolerances. The aim is also to be able to ascertain irregularities in operation.

This aspect is achieved in that the method for determining the end-of-travel positions of a diaphragm in a diaphragm valve preferably comprises the following steps:

initiating displacement of the diaphragm, wherein the diaphragm is moved preferably by means of an actuator, more preferably by means of a positioning actuator, into a first end-of-travel position;

ascertaining the first end-of-travel position of the diaphragm, wherein said first end-of-travel position is ascertained by monitoring an actuating current value, wherein the first end-of-travel position is reached when a current value predefined for the positioning actuator is reached;

saving the first end-of-travel position;

moving autonomously, preferably in the opposite direction, towards a second end-of-travel position of the diaphragm;

ascertaining the second end-of-travel position of the diaphragm, wherein said second end-of-travel position is ascertained by means of a predefined travel length or distance of the diaphragm from the first end-of-travel position;

saving the second end-of-travel position;

preferably detecting the actuating current value at the second end-of-travel position in order to verify and ensure the reached second end-of-travel position during normal operation.

This aspect is also achieved in that the method for determining the end-of-travel positions of a diaphragm in a diaphragm valve comprising an actuator comprises the following steps:

initiating displacement of the diaphragm into a first end-of-travel position;

ascertaining the first end-of-travel position of the diaphragm, wherein said first end-of-travel position is ascertained by monitoring an actuating current value, wherein the first end-of-travel position is reached when a current value predefined for the positioning actuator is reached;

saving the first end-of-travel position;

moving autonomously, preferably in the opposite direction, towards a second end-of-travel position of the diaphragm;

ascertaining an advance end-of-travel position of the diaphragm, wherein said advance end-of-travel position is ascertained by monitoring an actuating current value, wherein the advance end-of-travel position is reached when a current value predefined for the actuator is reached;

reaching and ascertaining the second end-of-travel position by additionally completing a predefined adjustment length of the diaphragm.

The method for determining the end-of-travel position of a diaphragm in a diaphragm valve can be initiated manually, preferably by operating a button, or also automatically. The initiation causes the diaphragm to move towards the first end-of-travel position, which is to be ascertained. The first end-of-travel position of the diaphragm preferably defines the maximum opening state of the diaphragm valve. The first end-of-travel position is ascertained by monitoring an actuating current. This means that the diaphragm moves towards the end-of-travel position while the actuating current is monitored. As long as no resistance arises, the actuating current remains more or less constant, designated here the running current. If the actuating current value increases to a predefined or preset current value, the diaphragm has reached the first end-of-travel position.

The increase in the actuating current for determining the first end-of-travel position is caused preferably by a mechanical resistance or end stop limiting the diaphragm, whereby the positioning actuator expends a higher force and hence a higher actuating current. It is identified thereby that the first end-of-travel position is reached, which position is then saved in the firmware or software as the first end-of-travel position.

After the first end-of-travel position is reached and ascertained, the diaphragm moves autonomously to the second end-of-travel position, which is to be ascertained, wherein the second end-of-travel position is disposed preferably in the opposite direction of movement, and preferably constitutes the closed position of the diaphragm valve.

The method has two options for ascertaining the second end-of-travel position. One option is for the diaphragm to move or lower out of the first end-of-travel position over a specified or predefined travel length or distance, and this position is saved as the second end-of-travel position. The actuating current detected at this position is used as a check value.

This can be used for verifying and ensuring the second end-of-travel position during commissioning of the diaphragm valve and even after commissioning of the diaphragm valve during normal operation. If, however, the actuating current at the second end-of-travel position drops, for instance, this is identified by the software and, for example, an error message is output that the diaphragm valve is no longer closing properly, or it adjusts itself autonomously.

The second option for ascertaining the second end-of-travel position is to detect and ascertain an advance end-of-travel position of the diaphragm by means of a predefined or specified current value. Starting from the advance end-of-travel position, a predefined or specified adjustment length is then completed, whereby the second end-of-travel position is reached and is saved.

The predefined current value for the advance end-of-travel position can either be predefined and stored as a pure current value, or else can be obtained by means of a stored calculation by firmware or a controller, and then also regarded as a predefined or specified current value. The specified current value for the advance end-of-travel position is preferably calculated as a function of the monitored running current. It is advantageous if the specified current value of the advance end-of-travel position lies 5-20%, more preferably 8-12%, above the detected and monitored average running current.

The actuating current value for detecting and ascertaining the first end-of-travel position of the diaphragm preferably changes as a result of a mechanical resistance, wherein the actuating current value rises to a specified maximum current value. As already mentioned, in order to ascertain the first end-of-travel position, the actuating current of the positioning actuator is monitored, and on reaching a specified current value it is ascertained that the diaphragm has reached the first end-of-travel position because of the mechanical end stop, which demands a higher current from the positioning actuator as soon as the diaphragm is at the end stop.

It has proved advantageous if a current value of 5-20% above the running current, more preferably 8-12%, is selected as the predefined or specified current value for the advance end-of-travel position, wherein this value can be calculated by the system autonomously on the basis of the monitored running current, but also can be stored to the system as a fixed value.

It is advantageous if the first end-of-travel position of the diaphragm defines the maximum opening state of the diaphragm valve.

In what has proved a preferred embodiment, the second end-of-travel position of the diaphragm constitutes the closed state of the diaphragm valve.

Obviously, it is also possible to move to the first and second end-of-travel positions in the reverse order for commissioning the diaphragm valve, and they can hence be designated differently.

By ascertaining the two maximum positions, the stroke of the diaphragm can be controlled during operation between the two positions individually.

It has proved advantageous that a running current establishes itself during the travel length of the diaphragm, during which no additional resistance arises, between the first end-of-travel position and the second end-of-travel position or respectively the advance end-of-travel position, wherein the running current must not exceed a specified current value. This running current is used for monitoring the diaphragm valve during the period in which no additional resistance arises. For instance it is monitored thereby whether dirt is additionally obstructing the threaded stem, or a foreign body has become stuck in the diaphragm valve and is hindering operation of the diaphragm, and it is also possible to monitor thereby other states that affect the actuating current. The magnitude or average value of the running current that arises during commissioning of the diaphragm valve is different from that during normal operation. This means that the current values that must not be exceeded are also different in the two operating states, because the running current during normal operation proves to be higher since the medium flowing through the diaphragm valve produces a certain resistance, which demands a higher actuating current.

It has proved advantageous if the position of the diaphragm is adjusted by means of a threaded stem, and the diaphragm is moved towards the first end-of-travel position by clockwise or anticlockwise rotation of the threaded stem, and the adjustment of the diaphragm into the second end-of-travel position or into the advance end-of-travel position is performed in the opposite direction or opposite direction of rotation.

An exemplary embodiment of the invention is described with reference to the figures, in which the invention is not limited solely to the exemplary embodiment, and in which:

DETAILED DESCRIPTION OF THE PREFERRED EMBODIMENT

Figure 1:
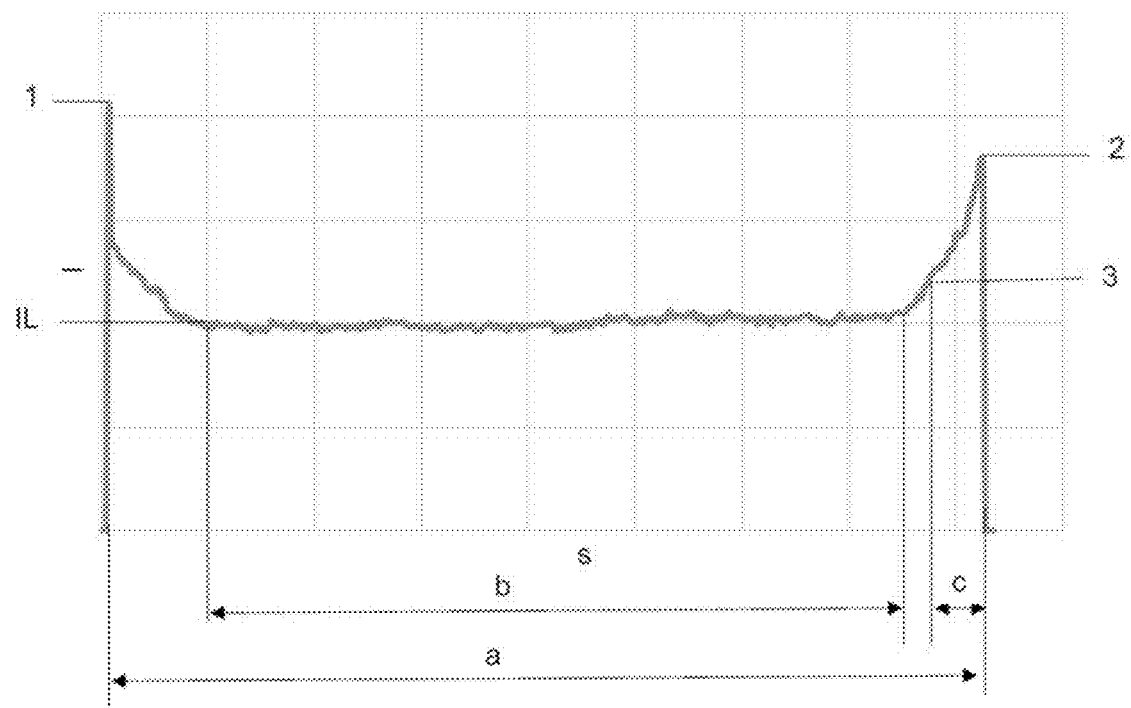
FIG. 1 shows a graph of the variation in actuating current of the positioning actuator of the diaphragm valve.

The drawing illustrated in FIG. 1 shows a graph which depicts the actuating current (I) with respect to the length or distance (s) by which the diaphragm (11) in the diaphragm valve (10) is displaced. As a result of the diaphragm displacement being initiated or, for instance, as a result of an actuating pushbutton on the positioning actuator being pressed, the diaphragm moves towards a first end-of-travel position (1). The actuating current (I) is monitored during this process, or throughout the method according to the preferred embodiment of the invention. If the actuating current then reaches an already predefined current value, which has been predefined as the value for ascertaining the first end-of-travel position, this position is ascertained as the first end-of-travel position (1) and saved, preferably in the firmware or in software of a controller, wherein the first end-of-travel position (1) preferably constitutes the open position of the diaphragm valve (10). In order to ascertain additionally the second end-of-travel position (2), the diaphragm moves autonomously in the opposite direction. There are two variants for ascertaining the second end-of-travel position (2). In one variant, the diaphragm moves towards the second end-of-travel position (2), which is to be ascertained, wherein the diaphragm has a predefined travel length (a) or distance assigned, and hence travels from the first end-of-travel position (1) along this travel length (a), and once arrived there, this is saved as the second end-of-travel position (2), and the actuating current is detected at the position ascertained as the second end-of-travel position (2). This detected actuating current at the second end-of-travel position (2) is preferably used during normal operation as the verification value. Hence, for example if the diaphragm has reached the second end-of-travel position (2) and the actuating current does not match the saved value, an error message is output or the diaphragm is re-adjusted autonomously. This can be used during commissioning or even during normal operation.

As a variant for commissioning a diaphragm valve (10), there is also the option to ascertain the second end-of-travel position (2) by monitoring the actuating current (I). Once the first end-of-travel position (1) has been reached and ascertained, the diaphragm moves in the opposite direction, and when a predefined current value is reached that corresponds to an advance end-of-travel position (3), at which a low resistance is already noticeable, a predefined adjustment length (c) is still completed, wherein the current value of the advance end-of-travel position (3) can be calculated by the system or the controller from detected values or can be stored as a fixed value. The second end-of-travel position (2) is reached by completion of the adjustment length (c) from the advance end-of-travel position (3), and is saved. The actuating current values detected are preferably used again in this case during normal operation and commissioning for verifying and ensuring a correctly operating diaphragm valve, in the same way as the other detected actuating current values could be used for this purpose. In addition, the running current (IL) during the positioning of the diaphragm over the distance or travel length (s), in which positioning there is no additional resistance acting on the diaphragm, is used to allow monitoring of whether the diaphragm valve is free of dirt or other foreign bodies that would obstruct or even block the displacement or movement of the diaphragm, wherein the running current (IL) during commissioning and during normal operation lies at a different level, because in normal operation a certain resistance acts on the diaphragm as a result of the medium, although this should not be viewed as the aforementioned additional resistance, which primarily relates to mechanical end stops, or to when the diaphragm is at the valve curve or the end stop.

Figures 2, 3:
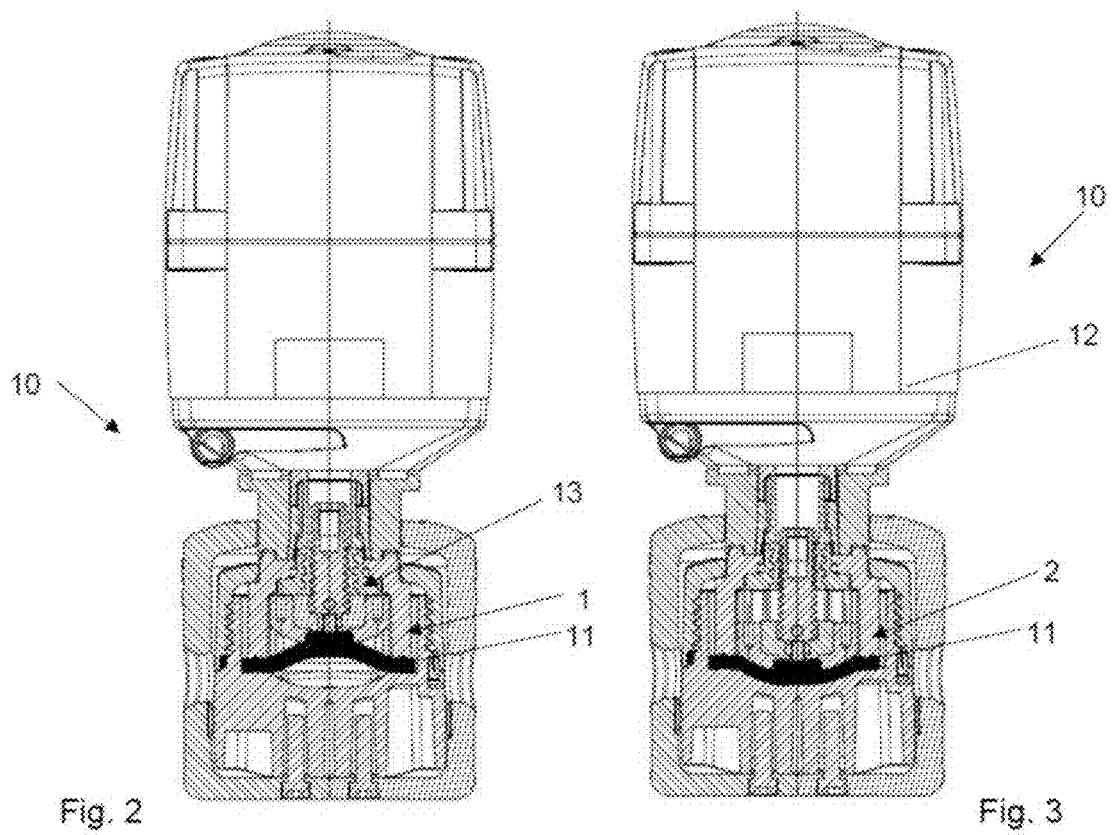
FIG. 2 shows a cross-section through a diaphragm valve in which the diaphragm is in the open position.
FIG. 3 shows a cross-section through a diaphragm valve in which the diaphragm is in the closed position.

FIGS. 2 and 3 show a diaphragm valve (10) comprising a positioning actuator 12, wherein FIG. 2 shows the open position and it is clearly evident that a mechanical end stop 13 prevents further opening or limits the prevailing opening. FIG. 3 shows a fully closed diaphragm valve 10.

The invention claimed is:

1. A method for determining the end-of-travel positions of a diaphragm (11) in a diaphragm valve (10) having an actuator, comprising:
   initiating displacement of the diaphragm into a first end-of-travel position (1);
   ascertaining the first end-of-travel position (1) of the diaphragm, wherein said first end-of-travel position (1) is ascertained by monitoring an actuating current value, wherein the first end-of-travel position (1) is reached when a predefined current value is reached;
   saving the first end-of-travel position (1);
   moving autonomously, preferably in the opposite direction, towards a second end-of-travel position (2) of the diaphragm;
   ascertaining the second end-of-travel position (2) of the diaphragm, wherein said second end-of-travel position (2) is ascertained by means of a predefined travel length (a) of the diaphragm from the first end-of-travel position (1);
   saving the second end-of-travel position (2); and
   preferably detecting the actuating current value (I) at the second end-of-travel position (2) in order to verify and ensure the reached second end-of-travel position (2).

2. A method for determining the end-of-travel positions of a diaphragm (11) in a diaphragm valve (10) having an actuator, comprising:
   initiating displacement of the diaphragm into a first end-of-travel position (1);
   ascertaining the first end-of-travel position (1) of the diaphragm, wherein said first end-of-travel position (1) is ascertained by monitoring an actuating current value, wherein the first end-of-travel position (1) is reached at a predefined current value;
   saving the first end-of-travel position (1);
   moving autonomously, preferably in the opposite direction, towards a second end-of-travel position (2) of the diaphragm;
   ascertaining an advance end-of-travel position (3) of the diaphragm, wherein said advance end-of-travel position (3) is ascertained by monitoring an actuating current value, wherein the advance end-of-travel position (3) is reached when a predefined current value is reached;
   reaching and ascertaining the second end-of-travel position (2) by additionally completing a predefined adjustment length (c) of the diaphragm;
   saving the second end-of-travel position (2).

3. A method according to claim 1, wherein the actuating current value (I) for detecting and ascertaining the first end-of-travel position (1) of the diaphragm changes as a result of a mechanical resistance, wherein the actuating current value (I) rises to a specified maximum current value.

4. A method according to claim 1, wherein the first end-of-travel position (1) of the diaphragm (11) defines the maximum opening state of the diaphragm valve (10).

5. A method according to claim 1, wherein the second end-of-travel position (2) of the diaphragm (11) constitutes the closed state of the diaphragm valve (10).

6. A method according claim 1, wherein a running current (IL) establishes itself during the travel length (b) of the diaphragm between the first end-of-travel position (1) and the second end-of-travel position (2) or respectively the advance end-of-travel position (3), wherein the running current (b) is not meant to exceed a specified current value.

7. A method according to claim 1, wherein the position of the diaphragm (11) is adjusted by means of a threaded stem, and the diaphragm is moved towards the first end-of-travel position (1) by clockwise or anticlockwise rotation of the threaded stem, and the adjustment of the diaphragm into the second end-of-travel position (2) or into the advance end-of-travel position (3) is performed in the opposite direction.

8. A diaphragm valve (10) comprising a positioning actuator (12), wherein during commissioning according to the method according to claim 1, the diaphragm valve (10) self-adjusts the end-of-travel positions (1, 2) of the diaphragm (11).

* * * * *